Aug. 27, 1957     H. C. KELLY ET AL     2,804,400
WOOD COATING METHOD AND PRODUCTS THEREOF
Filed Feb. 8, 1956
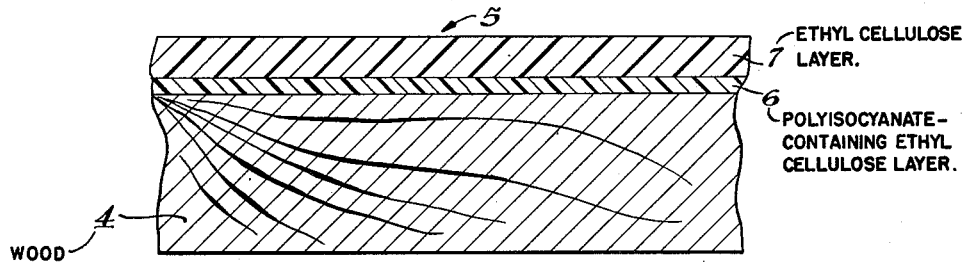
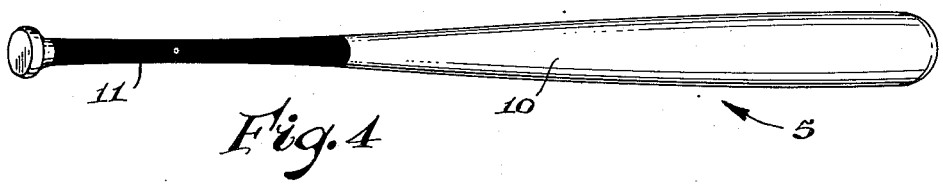
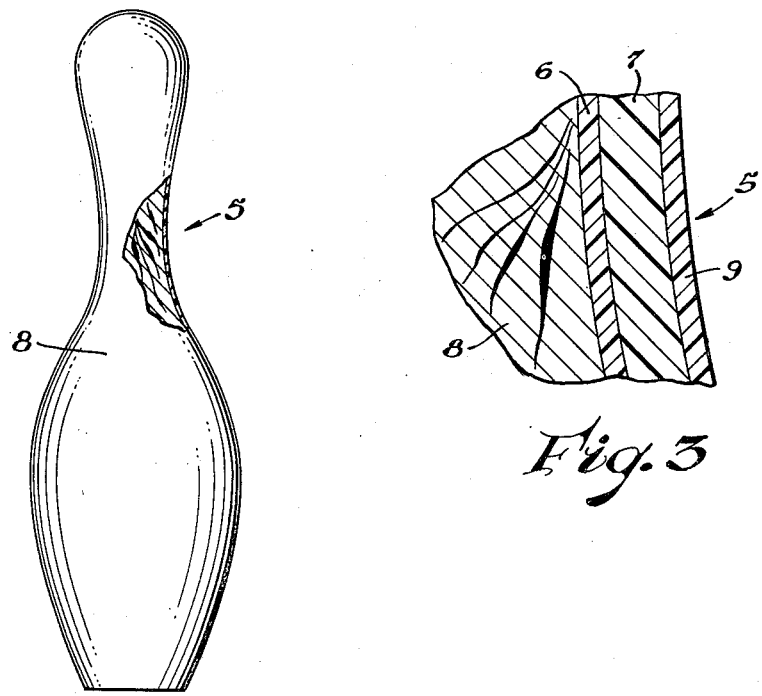
INVENTORS.
Harold C. Kelly
Edward J. Heiser
BY
Griswold & Burdick
ATTORNEYS United States Patent Office 2,804,400
Patented Aug. 27, 1957

2,804,400

WOOD COATING METHOD AND PRODUCTS THEREOF

Harold C. Kelly, Midland, and Edward J. Heiser, Sanford, Mich., assignors to The Dow Chemical Company, Midland, Mich., a corporation of Delaware Application February 8, 1956, Serial No. 564,178

17 Claims. (Cl. 117—85)

This invention relates to a method for coating wooden surfaces and articles to protect them against damage from impact and deterioration. More particularly, this invention relates to a method for providing wood with a tough and effective protective covering by utilizing a tightly-adhering, multicomponent coating system which comprises ethyl cellulose. The invention has specific reference to a method for protectively coating wooden implements and other paraphernalia employed in various recreational and athletic pursuits and activities, such as bowling pins and baseball bats, which frequently are subjected to severe concussive impact. It is also concerned with the sundry coated wooden products which advantageously are obtainable with improved physical attributes by the practice of the coating method.

As is well known, wooden surfaces are propense to check, pit, dent, chip and undergo grain separation or splintering when they are subject to physical shock or impact from or with other objects. Individual articles fashioned from wood are especially susceptible to being shattered, splintered and even fractured or completely broken from such causes. The embrittlement of wooden surfaces and articles due to dehydration or its swelling and increase in weight upon moisture absorption often aggravates this susceptibility. Such comportment is an extremely undesirable and defective characteristic of wood. Among the several serious consequences for which it is responsible is oftentimes an abbreviated useful life span for many articles and implements of wood.

Recreational and sports equipment and apparatus such as bowling pins, baseball bats and the like, for example, are commonly victim to a very high incidence of breakage in use due to their repeated severe collision and impact with, by and upon other objects and articles. Besides actual fracture or splintering, breakage also comprehends other conditions rendering the wooden article useless or unsatisfactory for additional employment.

The breakage of various wooden recreational and sports articles entails considerable expense by way of replacement on behalf of participants and sponsors of the various activities and enterprises in which they may be employed. Further, such articles are ordinarily manufactured from better quality grades of various types of wood whose conservation is a matter of great practical concern in the national economy. In addition, the breakage in use of various wooden recreational and sports apparatus involves considerable danger of injury to various participants and spectators who may be involved in a particular activity in which use is being made of the apparatus.

It would be advantageous for reasons of economy, conservation and safety to achieve an improved and superior resistance to breakage and damage for various wooden surfaces and articles including especially such articles as bowling pins and alleys, baseball bats, polo and croquet mallets, hockey sticks, cricket bats, arrows and javelins, tool handles, wooden propellers and fans, skis, toboggans, wood hulls and other like and related wooden surfaces and articles which are subject to damaging impact and other abusive conditions.

It is an object of the present invention to provide a tough, dense, impact-absorbing and shock-cushioning coating for wooden surfaces and articles to imbue them with superior resistance to breakage and with minimized propensity for physical deterioration under abusive conditions of employment. It is a further object to provide a coating for wood having, in addition to such desiderata, a tightly and tenaciously adhering nature. It is a related objective for the coating to be comprised of ethyl cellulose protective layers. It is also a related objective for the coating to be comprised of ethyl cellulose layers which are simply and expediently bonded to the wood surface in a tightly-adhering and highly effective manner. It is a particular object of the invention to provide such a salutary coating for various wooden recreational and sports equipment and apparatus including bowling pins and baseball bats and to secure greater endurance and extended useful life spans for such equipment. It is an additional object to provide a coating of this nature without detracting from or altering the normally acceptable utilitarian features and indicia of the coated wooden surfaces and articles. Various other objects and advantages of the invention are apparent throughout the following description and specification.

According to the invention, wooden surfaces and articles may advantageously be protectively covered with a multicomponent coating system which comprises first applying at least one polyisocyanate-containing ethyl cellulose layer to the bare surface of the wood; and subsequently applying at least one enveloping layer of an ethyl cellulose coating composition over the applied polyisocyanate-containing ethyl cellulose layer. In certain instances it may be especially advantageous to first directly prime the bare surface of the wood with a polyisocyanate compound before applying the polyisocyanate-containing ethyl cellulose layer. Each of the layers of the multicomponent coating may be applied by any suitable technique, including brushing, spraying or dipping. However, whenever it may be feasible, it is usually advantageous for the subsequent ethyl cellulose layer to be derived by dip coating in a gel lacquer formulation. Each applied layer is preferably permitted to thoroughly dry and set before application is made of the succeeding layer. Coated wooden surfaces and articles according to the invention have a composite, multicomponent, impact-resisting and shock cushioning protective coating comprised of superimposed enveloping layers of (1) polyisocyanate-containing ethyl cellulose and (2) ethyl cellulose. Such surfaces and articles have a greatly enhanced resistance to breakage and are less susceptible to damage or deterioration than when they are in an uncoated state.

Most polyisocyanates may be employed in combination with the ethyl cellulose or for directly priming the bare surface of the wood, if this is desirable. Advantageously, however, a diisocyanate, methylene bis(4 phenyl isocyanate), such as that which is available under the trade-name "Hylene M-50" from E. I. du Pont de Nemours and Company, Inc. is utilized. The polyisocyanates serve to cross link the ethyl cellulose and promote its adhesion to the bare surface of the wood. They also adapt the polyisocyanate-containing ethyl cellulose layer for function as an effective priming and sealing agent to facilitate the successful application of the subsequent ethyl cellulose layer without bubble formation, particularly when it is dip applied from an ethyl cellulose gel lacquer formulation. While varying amounts of the polyisocyanate can be suitably combined with ethyl cellulose in order to form the polyisocyanate-containing ethyl cellulose layer, it is generally advantageous for this purpose to employ the polyisocyanate in an amount between about 10 and 20 percent by weight of the weight of the polyisocyanate containing ethyl cellulose layer. The polyisocyanate-containing ethyl cellulose layer may advantageously be formulated with an ethyl cellulose having an ethoxyl content, usually-designated "standard," in the range from about 48.0 to 49.5 percent by weight which contains an average of between about 2.46 and 2.58 etherified ethyl substituents per glucose unit. It may have a viscosity less than about 30 centipoises, as determined in a solvent mixture consisting of about 80 parts by volume of toluene and 20 parts by volume of ethanol. It is frequently beneficial to employ a cellulose ether for the polyisocyanate-containing ethyl cellulose layer having a viscosity in the neighborhood of 6–11 centipoises.

The polyisocyanate-containing ethyl cellulose ether can be applied from a composition of the polyisocyanate and cellulose ether which is suitably dissolved in a solvent or solvent mixture for application. A typical composition may contain about 15 percent by weight of dissolved solids (including the polyisocyanate) in a solvent mixture containing roughly about 4 parts by weight of toluene to 1 part by weight of acetone, or in an equivalent solvent. Brush applications of at least one end preferably two or three coats of the polyisocyanate-containing ethyl cellulose layer are usually suitable in most instances. As is a customary requirement for the application of most coating materials, the surface should be dry, clean and free of dirt, finger prints or dust in order to obtain the most satisfactory results.

For most wooden articles the subsequent impact-absorbing layer may frequently be most advantageously derived from an ethyl cellulose gel lacquer composition which is applied by means of dip coating over the initial polyisocyanate-containing ethyl cellulose layer. An ethyl cellulose gel lacquer, as is conventionally understood, is a formulation that is particularly adapted for hot dip application in order to obtain relatively thick coatings with minimum application effort. Frequently a coating having a 5 to 20 mil and greater thickness can be obtained readily from a single dip of the relatively cooler article in the hot dip gel lacquer composition. The gel lacquer may advantageously be formulated with an ethyl cellulose having an ethoxyl content, usually-designated "medium," in the range from about 45 to 46.5 percent by weight and having a viscosity between about 10 and 200 and, more advantageously, between about 50 and 100 centipoises. If desired, light stabilizers and the like can be incorporated in the cellulose ethers employed for both the subsequent ethyl cellulose layer and for the initial polyisocyanate-containing ethyl cellulose layer in order to inhibit their discoloration and degradation on exposure to light and weathering.

Ethyl cellulose gel lacquers can be prepared with a variety of known solvents for dissolving the cellulose ether at an elevated temperature. Beneficially, however, the medium grade of ethyl cellulose gel lacquers which are advantageously employed in the practice of the present invention may be prepared with a solvent mixture of about 3 parts by weight of xylene and about 1 part by weight of an aliphatic petroleum hydrocarbon fraction similar to that which is available under the trade-designation "Apco Thinner" from the Anderson Prichard Oil Corporation. Solvents or solvent mixtures having equivalent solvent power and which are commensurate in other characteristics may, of course, also be utilized.

It is frequently desirable to plasticize the ethyl cellulose for formulation of the gel lacquer. A variety of known plasticizers and resins are available for this purpose. Advantageously however, an alkyd type resin composition which may be similar to those which are available under the trade-names "Paraplex RG–2," and "Glyptal 2557" from Rohm and Haas Company and General Electric Company, respectively, or a hydrocarbon resin such as the poly-alpha methyl styrene which is available under the trade-designation "Dow Resin 276–V9" from The Dow Chemical Company, may be employed. Ordinarily, it is advantageous to employ not more than 50 percent by weight of the plasticizer, based on the total weight of the plasticized ethyl cellulose. The gel lacquers can be prepared with varying dissolved solids contents (which includes the weight of the ethyl cellulose and the plasticizer). While a dissolved solids content in the neighborhood of 20–30 percent by weight is normally suitable, it can be varied over wide limits within and without the mentioned range, depending on the coating thickness which is desired to be obtained in each dipping operation and the number of dips to be employed. Usually it is desirable for the complete application of the gel lacquer to be accomplished in one or two dipping operations.

Ethyl cellulose gel lacquers are best formulated to provide smooth solutions at sufficiently low temperatures (which, however, are well above room temperatures) to minimize solvent loss by evaporation. The solvent composition and its employed concentration should be capable of effecting gelation at a temperature which is about 20–25 centigrade degrees beneath the dipping temperature. The gel lacquers employed in the present invention may be prepared conveniently by dissolving the ethyl cellulose and plasticizer with suitable agitation in the solvent mixture at a temperature of about 100° C. After the gel lacquer composition has been prepared and deaerated, it may be employed for dip application of the subsequent ethyl cellulose layer in the composite coating at temperatures between about 80 and 100° C.

As is the case with the ethyl cellulose employed in the polyisocyanate-containing coating, the ethyl cellulose gel lacquers may, if desired, be prepared with cellulose ethers which have higher or lower ethoxyl contents than the grades mentioned, provided that suitable adjustment is made in the solvent system which is employed. In addition, the subsequent ethyl cellulose layer may be derived from other types of ethyl cellulose coating compositions such as conventional ethyl cellulose lacquers. In such cases several applications may be required in order to attain a layer of desirable thickness. For many purposes, such as the coating of sizeable wooden surfaces on which dip application is impracticable, the brush application of a conventional ethyl cellulose lacquer may provide a preferable technique for obtaining a suitable ethyl cellulose layer over the initially applied layer of polyisocyanate-containing ethyl cellulose.

Usually an ethyl cellulose layer having a thickness of at least about 5 mils and, preferably, between about 15 and 50 mils is applied as the subsequent layer to the initially applied polyisocyanate-containing ethyl cellulose layer. Such a layer has sufficient thickness to permit the tough, dense, impact-absorbing and shock-cushioning properties of the ethyl cellulose portion of the multicomponent coating to protect the wooden surface or article effectively from damage due to shock and impact. It also serves to protect the wood from other deteriorating influences by providing ample impermeability as a barrier against moisture transmission so as to overcome the effects of dehydration and absorption. In certain articles such as bowling pins and baseball bats, where an essential weight proportion must be adhered to, it may be desirable to peel or remove some of the wood from the surface of the article or to coat articles which are purposely undersized so that the weight of the coated article can nearly approximate an acceptable weight which is conventional or "normal" for the particular article.

The accompanying drawing illustrates several articles which are advantageously protectively coated in accordance with the present invention. A coated wooden surface, greatly exaggerated out of true proportion, is represented by a fragmentary sectional view in Figure 1. A bowling pin, broken out partly in section is shown in Figure 2 while a fragmentary, magnified cross-sectional view of the coating layers applied on the bowling pin is shown in Figure 3. A baseball bat is perspectively illustrated in Figure 4.

The composite protective coating, represented generally by the reference numeral 5, on the surface of the wooden article 4 is comprised of a priming layer 6 of a polyisocyanate-containing ethyl cellulose which serves both to seal the wood so that bubbling is not caused in the subsequently applied ethyl cellulose layer and to effect superior adhesion of the composite coating 5 on the article; and the relatively thick, subsequent impact-resisting layer 7 of ethyl cellulose. As mentioned, the polyisocyanate in the layer 6 cross links the ethyl cellulose and promotes adhesion to the surface. The polyisocyanate-containing ethyl cellulose layer 6 may advantageously be brushed on while the subsequent ethyl cellulose layer 7 of the composite coating 5 may advantageously be derived in suitable thickness by one or two dip applications with an ethyl cellulose gel lacquer composition.

A wooden item of sports equipment, such as the bowling pin 8 shown in Figure 2 may advantageously be provided with such an impact-resisting and shock-cushioning composite protective coating 5. Since the ethyl cellulose layer 7 is relatively readily scratched and is susceptible to retain dirt and soil on its surface, it may be desirable to provide a relatively hard, scratch and dirt stain resisting outer covering or top coat over the ethyl cellulose layer in the composite coating. This may conveniently be accomplished by application of a thin covering of a hard lacquer or like coating material such as the nitrocellulose lacquer and equivalent materials which are conventionally directly applied for such purposes on bowling pins. This is illustrated in greater detail by the magnified fragmentary cross-sectional view of the coating on the bowling pin in Figure 3 wherein a thin coating 9 of a conventionally obtainable, light, hard-finish lacquer is superficially applied over the ethyl cellulose layer 7 in the composite coating 5. The thin top coat layer 9 minimizes scratching and soiling of the protectively coated article.

In an analogous manner it may also be desirable to provide a friction gripping surface on certain coated wooden articles to facilitate their handling and to overcome the relatively slippery characteristics of the outer layer of ethyl cellulose in the composite coating. This is illustrated by the baseball bat 10 depicted in Figure 3 which is provided with a friction gripping surface 11 on its handle portion. The friction grippng surface 11 may be obtained readily with a coating of a friction-providing vinyl or neoprene-based composition such as a paint which may be similar to that obtainable under the trade-designation "1143 Neoprene Gray" from the Saran Protective Coating Company of Ferndale, Michigan.

In a series of examples which further illustrate the practice of the present invention, various maple panels were provided with a composite coating consisting of superimposed layers of polyisocyanate-containing ethyl cellulose and ethyl cellulose. The initial polyisocyanate-containing ethyl cellulose layer was obtained by brush application of three coats of a composition containing about 14.5 percent by weight of solids comprising about 4 parts by weight of a standard ethoxyl value ethyl cellulose having a viscosity of about 10 centipoises, similar to that which is obtainable under the trade-name "Ethocel, 10 cps., std." from The Dow Chemical Company and 1 part by weight of "Hylene M–50" (non-volatile) dissolved in a solvent mixture comprised of about 80 parts by weight of toluene and 20 parts by weight of acetone which also contained a small proportion (in the neighborhood of about 3 parts by weight) of ortho-dichlorobenzene from the polyisocyanate composition.

The initially applied polyisocyanate-containing ethyl cellulose layer was covered by an enveloping subsequent layer of ethyl cellulose derived by single dip application of an ethyl cellulose gel lacquer composition to obtain a layer thickness of about 15 mils. The gel lacquer formulation which was employed consisted of about 23 percent by weight of solids comprised of 70 parts by weight of a medium ethoxyl value ethyl cellulose having a viscosity of about 50 centipoises, similar to that which is obtainable under the trade-name "Ethocel, 50 cps., med." from The Dow Chemical Company and 30 parts by weight of "Paraplex R6–2" plasticizer along with small proportions of a stabilizer dissolved in a solvent mixture comprised of 3 parts by weight of xylene and 1 part of by weight of "Apco Thinner." Each of the panels were dip coated, without any occurrence or formation of bubbles, in the gel lacquer while the latter was being maintained at a temperature between 80 and 100° C.

All of the coated panels were exceptionally durable and resistant to breakage upon impact including, besides fracture and splintering, chipping, denting and pitting. Similar results were obtained when the polyisocyanate-containing ethyl cellulose composition was altered to contain about 9 parts by weight of the ethyl cellulose and 1 part by weight of "Hylene M–50" in the solids and when only two coats of the polyisocyanate-containing ethyl cellulose composition were applied following an initial direct brushing of the wood surface with "Hylene M–50."

By way of further example, the life span of bowling pins can be increased by as much as two to three times and more when they are coated in accordance with the present invention. The very best quality conventional bowling pins which are available can be used for about 1,000 lines (or complete games) of bowling. Many pins which are used do not provide such a maximum degree of performance. Good quality bowling pins coated in accordance with the present invention in a manner similar to the foregoing have been employed for 2,000 and more lines while remaining in useful condition. The coated pins provide the same "ringing" sound as conventional pins when they are hit. They also have commensurate scoreability or knock down and toppling characteristics when hit as do conventional pins. Bowling pins made from inferior grades of wood and coated in accordance with the present invention are capable of achieving an equivalent life span to the very best quality conventional uncoated pins which may be obtained.

Analogous advantage and benefit can also be realized when such articles as baseball bats, hockey sticks and other sports equipment are coated in a manner in accordance with the invention.

Since certain changes and modifications in the practice of the present invention can readily be entered into without substantially departing from its intended spirit and scope, it is to be fully understood that all the foregoing description and specification be interpreted and construed as being merely illustrative of certain of the preferred embodiments of the invention which in no sense or manner is to be understood as being limited or restricted thereby excepting as it is set forth and defined in the appended claims.

What is claimed is:

1. Method for protectively coating wooden surfaces and articles to provide them with an increased resistance to breakage which comprises initially applying a layer of a polyisocyanate-containing ethyl cellulose to the bare wooden surface; and subsequently applying an ethyl cellulose layer over the polyisocyanate-containing ethyl cellulose layer.

2. Method for protectively coating wooden surfaces and articles to provide them with an increased resistance to breakage which comprises initially applying a layer of a polyisocyanate-containing ethyl cellulose to the bare wooden surface; and subsequently applying an ethyl cellulose layer over the initial layer by dip application of an ethyl cellulose gel lacquer formulation.

3. The method of claim 2 and including the preliminary step of directly coating the bare surface of the wood with a polyisocyanate before initially applying the layer of a polyisocyanate-containing ethyl cellulose.

4. The method of claim 2 wherein the polyisocyanate-containing ethyl cellulose contains between about 10 and 20 percent by weight of the polyisocyanate.

5. The method of claim 2 wherein the polyisocyanate is methylene bis(4 phenyl isocyanate).

6. The method of claim 2 wherein the polyisocyanate-containing ethyl cellulose is prepared from an ethyl cellulose having an ethoxyl content between about 48.0 and 49.5 percent by weight and a viscosity less than about 30 centipoises, as determined in a 5 percent by weight solution thereof in an 80:20 mixture, by volume, of toluene and ethanol.

7. The method of claim 6 wherein the ethyl cellulose has a viscosity in the neighborhood of about 6–11 centipoises.

8. The method of claim 2 wherein the applied ethyl cellulose layer has a thickness of at least about 5 mils.

9. The method of claim 2 wherein the ethyl cellulose gel lacquer formulation from which the subsequently applied ethyl cellulose layer is derived is formulated with an ethyl cellulose having an ethoxyl content between about 45 and 46.5 percent by weight and a viscosity between about 10 and 200 centipoises, as determined in a 5 percent by weight solution thereof in an 80:20 mixture, by volume, of toluene and ethanol.

10. The method of claim 2 and including the additional step of covering the subsequent ethyl cellulose layer with a thin, scuff and dirt-resisting top coat of a hard finish lacquer coating material.

11. Method for protectively coating wooden surfaces and articles to provide them with an increased resistance to breakage which comprises initially applying a layer of a methylene bis-(4 phenyl isocyanate)-containing ethyl cellulose, which contains between about 10 and 20 percent by weight of the polyisocyanate, in which the ethyl cellulose has an ethoxyl content between about 48.0 and 49.5 percent by weight and a viscosity in the neighborhood of 6–11 centipoises, as determined in a 5 percent by weight solution thereof in an 80:20 mixture by volume, of toluene and ethanol; and subsequently applying an ethyl cellulose layer, having a thickness between about 15 and 50 mils, over the initial layer by dip application of an ethyl cellulose gel lacquer formulation which is formulated with an ethyl cellulose having an ethoxyl content between about 45 and 46.5 percent by weight and a viscosity between about 50 and 100 centipoises.

12. A breakage-resisting wooden article having a composite, multicomponent protective coating on its surface comprised of superimposed layers of first (1) a polyisocyanate-containing ethyl cellulose and then (2) ethyl cellulose thereover.

13. A breakage-resisting wooden article having a composite, multicomponent protective covering on its surface comprised of a layer of a polyisocyanate-containing ethyl cellulose and a superimposed layer of ethyl cellulose having a thickness of at least about 5 mils.

14. A coated article in accordance with claim 13 wherein the thickness of the superimposed ethyl cellulose layer is between about 15 and 50 mils.

15. A coated article in accordance with claim 13 wherein the polyisocyanate-containing ethyl cellulose layer contains between about 10 and 20 percent by weight of a polyisocyanate.

16. A coated article in accordance with claim 13 wherein the polyisocyanate in the polyisocyanate-containing ethyl cellulose layer is methylene bis (4 phenyl isocyanate).

17. A coated baseball bat is accordance with claim 13 having an additional coating of a friction-providing material on its gripping surface.

References Cited in the file of this patent
UNITED STATES PATENTS

| | | |
|---|---|---|
| 1,883,396 | Moss | Oct. 18, 1932 |
| 2,101,714 | Keeney | Dec. 7, 1937 |
| 2,231,892 | Esselmann | Feb. 18, 1941 |
| 2,357,458 | Clough | Sept. 5, 1944 |
| 2,430,479 | Pratt | Nov. 11, 1947 |